United States Patent [19]

McElroy

[11] Patent Number: 5,718,554
[45] Date of Patent: Feb. 17, 1998

[54] TRUCK TRAILER WITH REMOVABLE RACKS

[75] Inventor: Johnny R. McElroy, Snyder, Okla.

[73] Assignee: The McElroy Company, Inc., Snyder, Okla.

[21] Appl. No.: 543,562

[22] Filed: Oct. 16, 1995

[51] Int. Cl.$^6$ .................................................. B60P 1/64
[52] U.S. Cl. ........................... 414/500; 414/498; 414/480
[58] Field of Search ................................. 414/482, 480, 414/498, 499, 500, 481; 296/156, 167, 168, 170, 35.3; 254/323

[56] References Cited

U.S. PATENT DOCUMENTS

| | | | |
|---|---|---|---|
| 2,665,020 | 1/1954 | Whittle | 414/500 |
| 3,034,674 | 5/1962 | Bertoglio et al. | 414/500 X |
| 3,473,679 | 10/1969 | Weichel | 414/498 X |
| 3,679,081 | 7/1972 | Duncan, Jr. | 414/499 |
| 4,630,991 | 12/1986 | Landolle et al. | 414/480 X |
| 5,234,308 | 8/1993 | Mann | 414/480 |

FOREIGN PATENT DOCUMENTS

| | | | |
|---|---|---|---|
| 1139655 | 2/1985 | U.S.S.R. | 414/480 |

*Primary Examiner*—Frank E. Werner
*Attorney, Agent, or Firm*—Dunlap & Codding

[57] ABSTRACT

A truck trailer with a removable rack adapted for loading and unloading livestock without a loading chute. The trailer and rack have pivotable rear sections to define a loading ramp when pivoted to the ground. A pair of slide rails on the upper surface of the trailer and a pair of slide channels on the lower surface of the rack cooperate to guide the rack onto and from the trailer. A number of lock bars are pivotally mounted to the inner side walls of the rack to secure the rack on the trailer. Using a winch and truck hydraulics, one person is able to pull the rack onto the trailer. The task of removing the rack from the trailer can also be performed by one person.

3 Claims, 4 Drawing Sheets

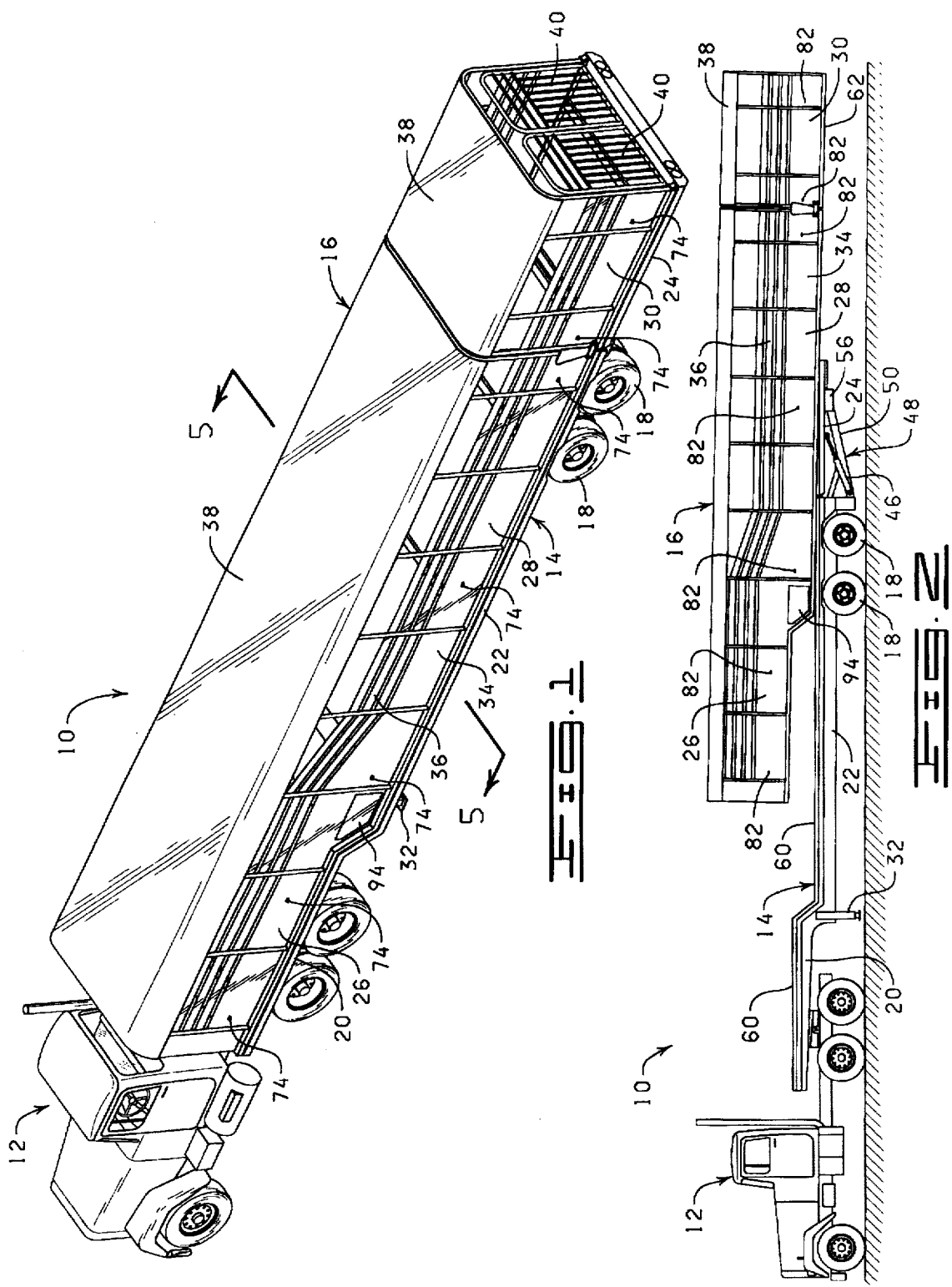

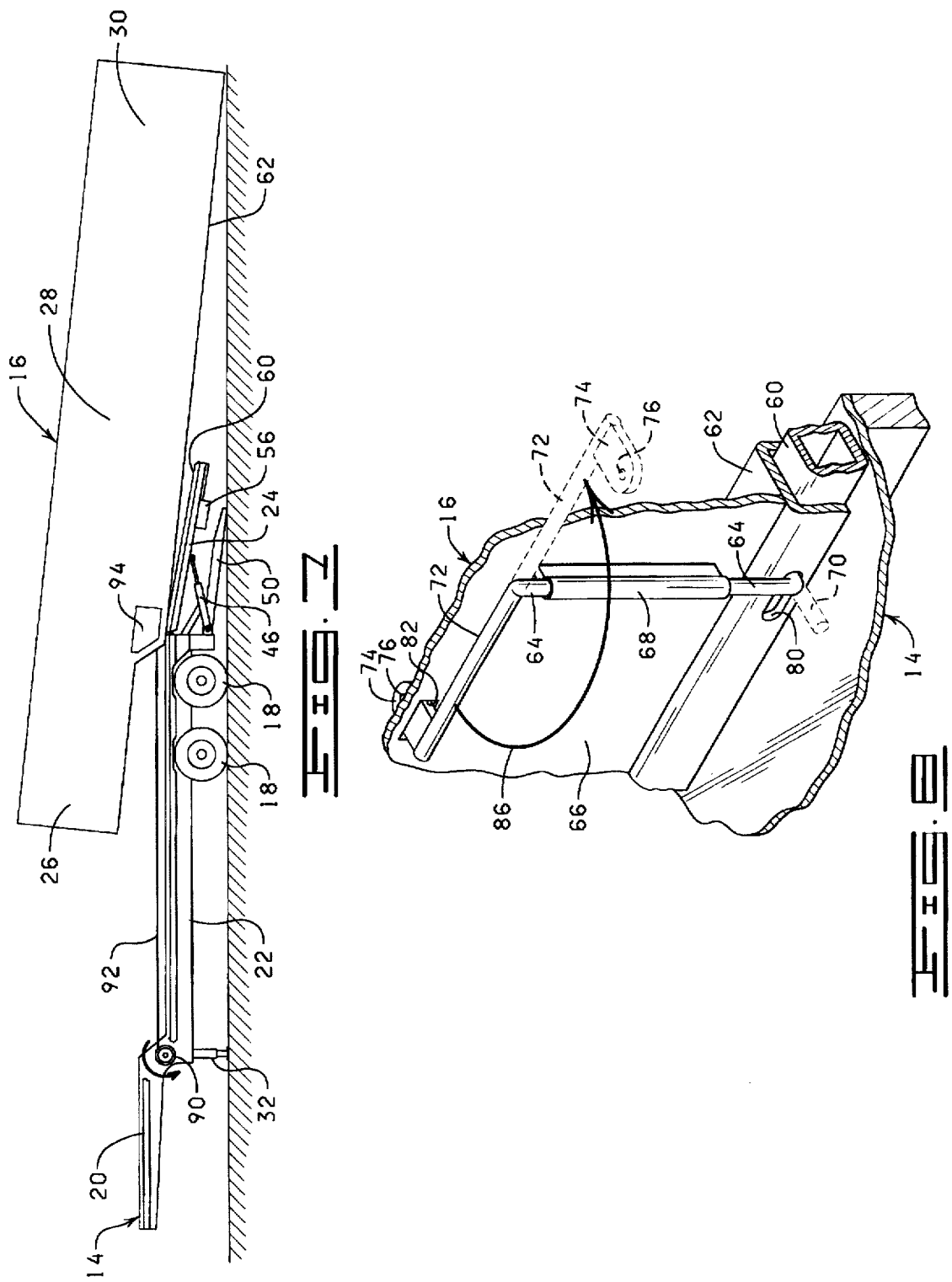

5,718,554

TRUCK TRAILER WITH REMOVABLE RACKS

BACKGROUND OF THE INVENTION

1. Field of the Invention

The present invention relates generally to truck trailers and particularly, but not by way of limitation, to truck trailers with removable racks for transporting feed, hay, livestock, tractors and implements.

2. Description of Related Art

Various types of truck trailers are known in the art. Some conventional trailers require the use of a loading chute or ramp in order to load livestock. Other trailers are designed for transporting livestock, but are not entirely suitable for hauling hay or tractors or other items needed for farming or ranching. Further, it is difficult or impossible for some trailers to be operated by one person in the loading or unloading of livestock, hay, feed, tractors or other loads.

SUMMARY OF THE INVENTION

The present invention comprises a trailer and a load rack, such a livestock rack, which can be easily removed from and returned to the trailer by one person. The trailer has a forward section, a middle section and a rear section. Further, the trailer includes a pair of rails which extend from the upper surface of the trailer substantially for the length of the trailer.

The load rack has a pair of channels which are located at the lower surface of the load rack. Each one of the channels is sized and shaped to receive a corresponding one of the rails of the trailer.

In winching the load rack onto the trailer, the channels of the load rack slide over the rails of the trailer to guide the load rack onto the trailer. When removing the load rack from the trailer, the channels of the load rack also slide over the rails so that the load rack travels straight off the rear section of the trailer.

Other objects, features and advantages of the present invention are apparent from the following detailed description when read in conjunction with the accompanying drawings and appended claims.

BRIEF DESCRIPTION OF THE DRAWINGS

FIG. 1 is a perspective view of a truck, trailer and rack constructed in accordance with the present invention. The rack is fully mounted and locked onto the trailer.

FIG. 2 is a side view of the truck, trailer and rack of FIG. 1. The rack is partially removed from the trailer.

FIG. 7 is partly diagrammatical side view of the trailer and rack, illustrating the rack being pulled onto the trailer.

FIG. 8 is a partly sectional, partly diagrammatical perspective view of the complete apparatus for locking the rack onto the trailer.

DETAILED DESCRIPTION OF THE PREFERRED EMBODIMENTS

Figure 3:
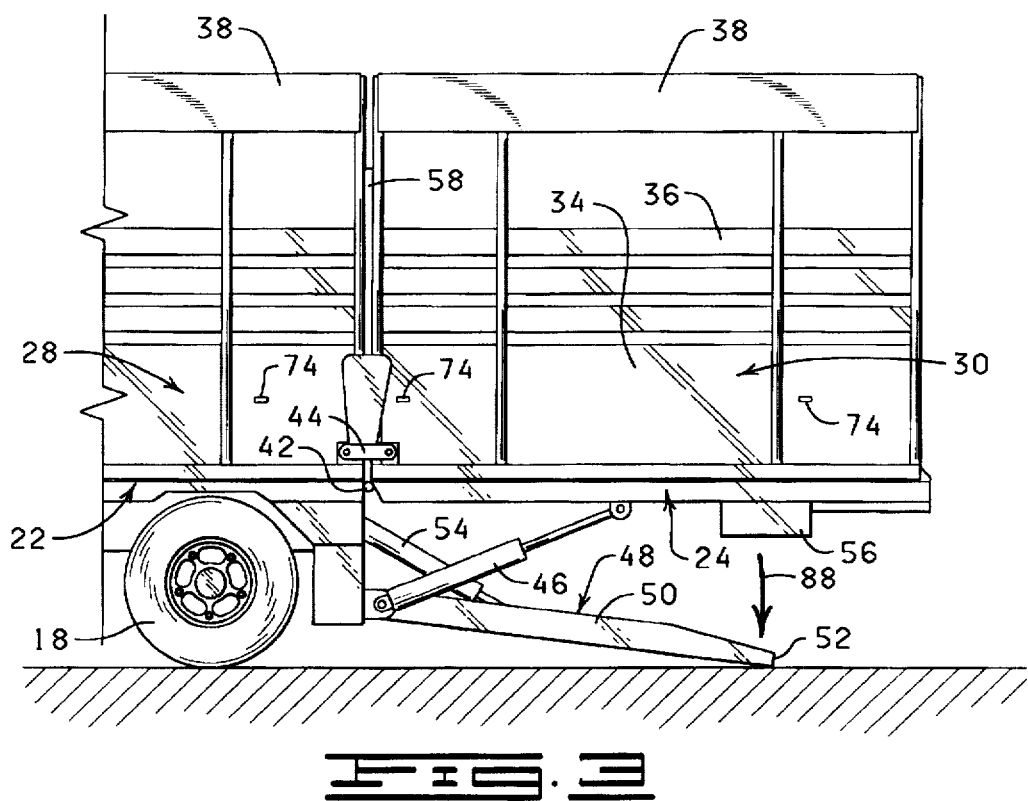
FIG. 3 is a side view of a rear portion of the trailer and rack. The trailer and rack are in a position preliminary to lowering the rear portion to the ground for loading livestock.

Referring to the drawings in general, and to FIG. 1 in particular, shown therein and designated by the general reference numeral 10 is a truck and trailer assembly, which includes a tractor truck 12, a trailer 14 and a rack 16.

The trailer 14 is connected electrically, mechanically and hydraulically to the truck in any conventional manner. Typically, the trailer 14 includes dual axles with dual tires 18 on each side of each axle.

The trailer 14 has a front section 20, a middle section 22 and a rear section 24. Similarly, the rack 16 has a front section 26, a middle section 28 and a rear section 30, each of which is complementary to those of the trailer 14.

As best seen in FIG. 2, the front section 20 of the trailer 14 is offset upward from the middle section 22 of the trailer 14. Further, the front section 20 of the trailer 14 is adapted to connect to the truck 12 in a conventional manner. The trailer 14 is provided with a pair of jackstands 32 to support the front section 20 when the trailer 14 is not attached to the truck 12.

In a manner disclosed hereinbelow, the rear sections 24 and 30 of the trailer 14 and rack 16 are pivotable between a transporting position and a loading position. In the transporting position, the rear sections 24 and 30 are substantially coplanar with the middle sections 22 and 28. In the loading position, the rear sections 24 and 30 are angled downward from the middle sections 22 and 28 to the ground to define a loading chute.

As shown in FIG. 1, the rack 16 may be constructed for loading, transporting and unloading livestock. Accordingly, the livestock rack 16 includes side panels, one of which is designated by reference numeral 34, and side railing, such as that designated by reference numeral 36. Further, the rack 16 has a cover 38 to protect the livestock from the elements. With this construction, the animals in the rack 16 receive air and are protected from inclement weather.

A pair of rear gates 40 are provided to hold the livestock within the rack 16. Moreover, partition gates (not shown) may be provided across the interior of the rack 16 at various points in order to keep the livestock in separate groups as desired or necessary.

The rack 16 is removable from the trailer 14 in a manner disclosed hereinbelow. FIG. 2 shows the rack 16 partially removed from the trailer 14.

Figure 4:
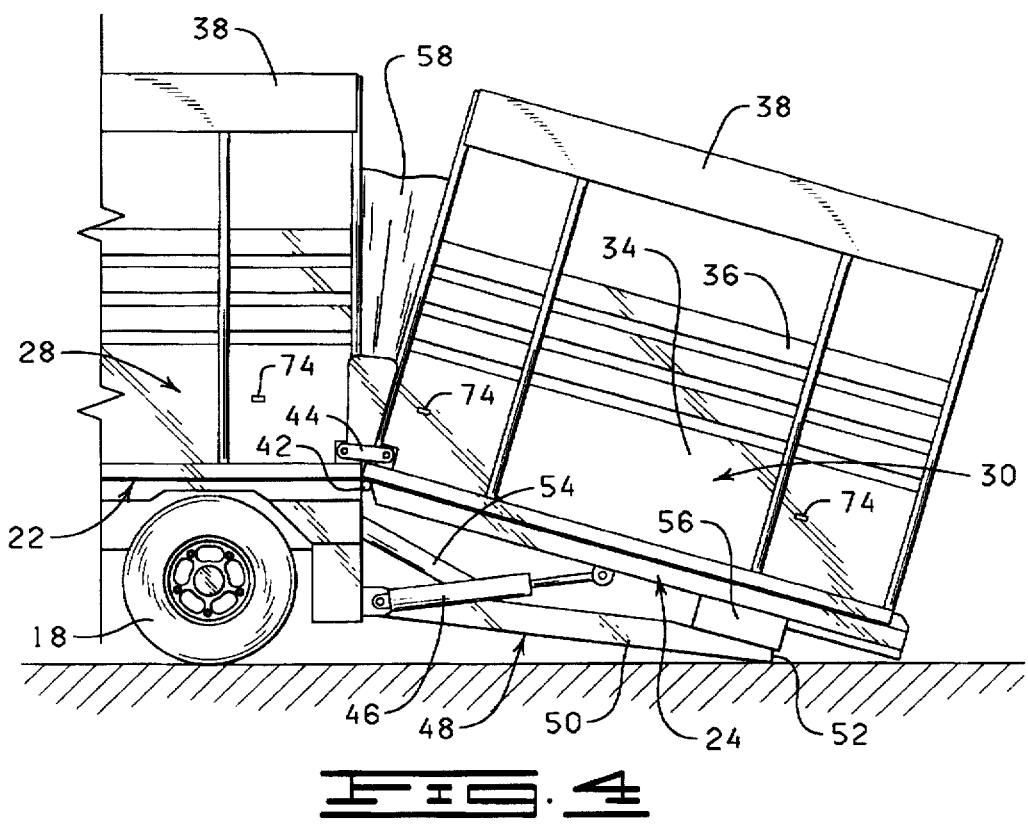
FIG. 4 is the same view as FIG. 3, except that the rear portion of the trailer and rack are completely lowered to the ground for loading livestock.

Referring to FIGS. 3 and 4, shown therein are the rear sections 24 and 30 and a portion of the middle sections 22 and 28 of the trailer 14 and rack 16. The rear section 24 of the trailer 14 is pivotally mounted to the middle section 22 of the trailer 14 at pivot point 42. Similarly, the floor of the rear section 30 of the rack 16 is pivotally mounted to the floor of the middle section 28 of the rack 16 at pivot point 44. Thus, when the rack 16 is fully on the trailer 14, the pivot points 42 and 44 are positioned at substantially the same location so that the rear sections 24 and 30 may pivot together.

A pair of outer hydraulic cylinders 46 are pivotally mounted between the frame of the trailer 14 and the rear section 24 of the trailer 14. These outer cylinders 46 are used to raise and lower the rear section 24 of the trailer 14.

Between the outer cylinders 46, a ladder-like support brace 48 is provided. The support brace 48 includes a pair of support arms 50 and a plurality of cross arms (not shown) extending between the support arms 50.

The support arms 50 have a pivot end clevis-mounted to the frame of the trailer 14 and a free end 52. An inner hydraulic cylinder 54 is pivotally mounted between the frame of the trailer 14 and one of the cross arms of the support brace 48. The inner cylinder 54 is used to raise and lower the support brace 48.

A pair of brace pockets 56 are located on the underside of the rear section 24 of the trailer 14. Each one of the brace pockets 56 is positioned to receive the free end 52 of the corresponding support arm 50 when the rear section 24 of the trailer 14 is in the transporting position (See FIG. 2).

With the free ends 52 of the support arms 50 positioned in the brace pockets 56, the rear sections 24 and 30 of trailer 14 and rack 16 may be fully supported by the support arms 50. In this manner, it is not necessary to maintain hydraulic pressure on the inner cylinder 54 and outer cylinders 46 to retain the rear sections 24 and 30 in the transporting position. Lock holes and lock pins (not shown) may be provided to secure the free ends 52 of the support arms 50 within the brace pockets 56.

As best seen in FIG. 4, a screen 58 extends between the middle section 28 of the rack 16 and the rear section 30 of the rack 16. The screen 58 is provided to prevent animals from escaping between the middle section 28 and the rear section 30 of the rack 16 when the rack 16 is in the loading position. When the rack 16 is in the transporting position, the screen 58 is compressed between the middle section 28 and rear section 30 of the rack 16.

The screen 58 may be constructed of various types of materials, such as canvas, polypropylene, natural or synthetic rubber or a metallic mesh. Alternatively, the screen 58 may be made of a rigid metal or plastic which has hinges or folds to open and close accordion-style.

Figure 5:
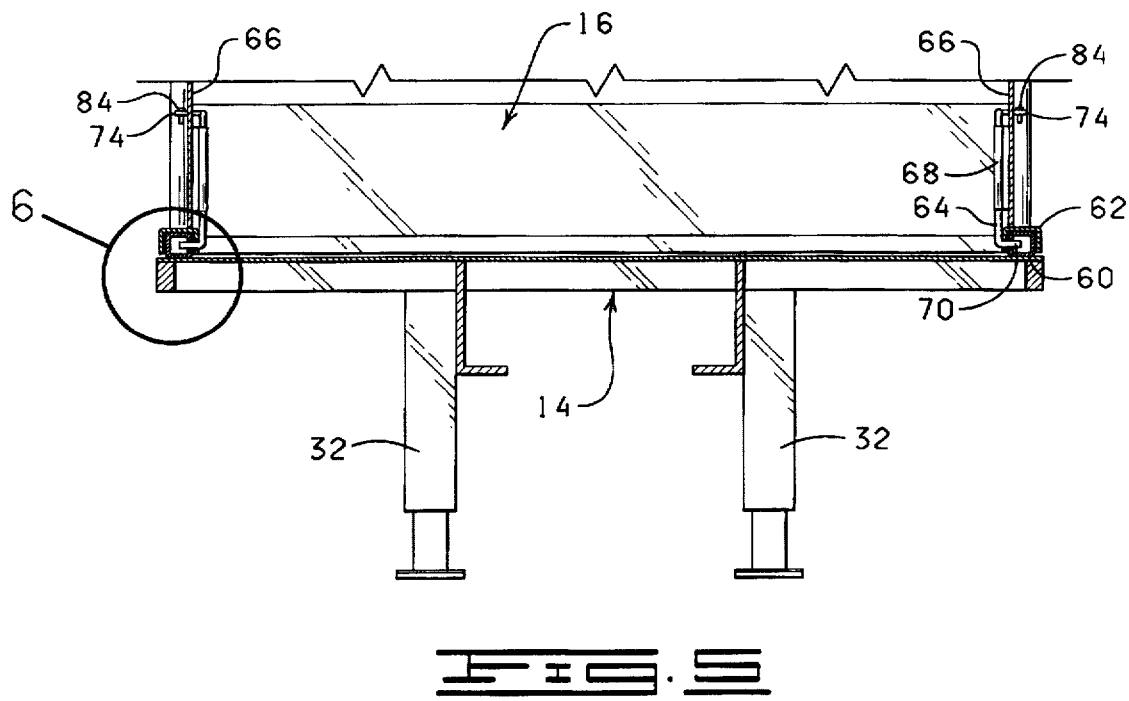
FIG. 5 is a partial, sectional view of the trailer and rack taken along the lines 5—5 of FIG. 1.
Figure 6:
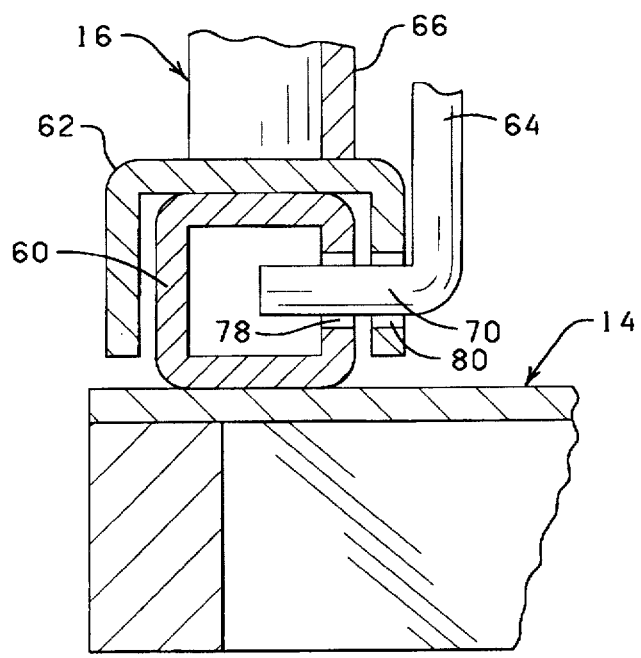
FIG. 6 is an enlarged view of a portion of FIG. 5, showing a portion of the apparatus for locking the rack onto the trailer.

With reference to FIGS. 5 and 6, shown therein is the construction for mounting the rack 16 on the trailer 14. A pair of slide rails 60 are located on the upper surface of the trailer 14 and a pair of slide channels 62 are on the lower surface of the rack 16. As best seen in FIG. 6, the slide rails 60 of the trailer 14 are substantially square in cross-section and the slide channels 62 of the rack 16 are substantially C-shaped in cross-section to fit over the top and sides of the slide rails 60.

It should be appreciated that the slide rails 60 and slide channels 62 may be made in a wide variety of shapes. Any shape is acceptable, as long as the slide rails 60 and slide channels 62 cooperate to allow the rack 16 to slide lengthwise with respect to the trailer 14.

Typically, one slide rail 60 and one slide channel 62 are located at each side of the trailer 14 and rack 16, respectively. However, it should be appreciated that the number and location of the slide rails 60 and slide channels 62 may be varied.

The slide rails 60 and slide channels 62 typically extend for substantially the entire length of the trailer 14 and rack 16, respectively. However, the slide rails 60 and slide channels 62 need only have lengths and locations which serve to slidingly guide the rack 16 onto and off from the trailer 14.

Referring to FIGS. 5, 6 and 8, shown therein is a preferred construction for locking the rack 16 on the trailer 14. A plurality of lock bars 64 are pivotally mounted to both inside walls 66 of the rack 16. As best seen in FIG. 8, a sleeve 68 is affixed to the inside wall 66 of the rack 16 for each lock bar 64 and a mid-portion of the lock bar 64 extends through the sleeve 68 for pivotal movement.

At one end of each lock bar 64 is a lock lug 70 and at the opposite end of each lock bar 64 is a lock arm 72. At the end of each lock arm 72 is a lock plate 74 having a lock hole 76 therethrough.

Each lock lug 70 is perpendicular with the mid-portion of its corresponding lock bar 64 extending through its respective sleeve 68. Each lock arm 72 is perpendicular to both the mid-portion of its corresponding lock bar 64 and its corresponding lock lug 70. Each lock plate 74 is perpendicular to its corresponding lock arm 72 and parallel with its corresponding lock lug 70.

As best seen in FIG. 6, a rail slot 78 extends through the inside wall of the slide rail 60 of the trailer 14 for each lock bar 64. Similarly, a channel slot 80 through the inside wall of the slide channel 62 of the rack 16 is provided for each lock bar 64. When the rack 16 is fully positioned on the trailer 14, the rail slot 78 and the channel slot 80 for each lock bar 64 are located to align with one another.

As shown in FIG. 8, a wall slot 82 is provided through the wall of the rack 16 for each lock bar 64. The wall slot 82 for each lock bar 64 is shaped and located to receive its corresponding lock plate 74 when the rack 16 is fully positioned on the trailer 14.

The number and location of the lock bars 64 may be varied. In a typical arrangement, fourteen lock bars 64 are provided, i.e seven lock bars 64 on each side. The seven lock bars 64 on each side are positioned with two lock bars 64 in the front section 26, three lock bars 64 in the middle section 28 and two lock bars 64 in the rear section 30. These locations are generally indicated by the lock plates 74 or wall slots 82 in FIGS. 1 through 4.

When each lock bar 64 is pivoted into the locked position (shown in solid lines in FIGS. 5, 6 and 8), its lock lug 70 protrudes into the corresponding channel slot 80 and rail slot 78 and its lock plate 74 extends through the corresponding wall slot 82. A lock pin 84 (shown in FIG. 5), padlock or the like may be fastened through the lock hole 76 of each lock plate 74 to securely lock the rack 16 to the trailer When each lock bar 64 is pivoted into the unlocked position (shown in dashed lines in FIG. 8), its lock lug 70 is removed from the channel and rail slots 80 and 78 and its lock plate 74 is removed from the wall slot 82. In pivoting one of the lock bars 64 from the locked position to the unlocked position, both its lock lug 70 and its lock plate 74 are swung around 180 degrees, as indicated by the rotational arrow 86.

Lowering the Rear Sections

Lowering the rear sections 24 and 30 of the trailer 14 and rack 16 is best understood with reference to FIGS. 3 and 4. First, the outer cylinders 46 are extended to elevate the brace pockets 56 such that the ends 52 of the support arms 50 can pivot downward out of the brace pockets 56. Next, the inner cylinder 54 is extended to lower the free ends 52 of the support arms 50 to the ground, as shown in FIG. 3 and indicated by rotational arrow 88.

Finally, the outer cylinders 46 are retracted to lower the rear end of the rear sections 24 and 30 to the ground. In this position, the trailer 14 and rack 16 are prepared for ground loading livestock. A loading chute is not required.

Raising the Rear Sections

Raising the rear sections 24 and 30 of the trailer 14 and rack 16 is essentially a reversal of the steps for lowering the rear sections 24 and 30. From the lowered position shown in FIG. 24, the outer cylinders 46 are extended to pivot the rear sections 4 and 30 upward. The outer cylinders 46 should be extended far enough to create space for the free ends 52 of the support arms 50 to pivot in front of the brace pockets 56.

Next, the inner cylinder 54 is retracted to pivot the free ends 52 of the support arms 50 to the underside of the rear section 24 of the trailer 14 in front of the brace pockets 56. Then, the outer cylinders 46 are retracted enough that the free ends 52 of the support arms 50 become seated in the brace pockets 56. In this manner, the support arms 50 bear the weight of the rear sections 24 and 30 without the need for hydraulic pressure.

Loading the Rack onto the Trailer

Loading the rack 16 onto the trailer 14 is best understood with reference to FIG. 7. As illustrated by FIG. 7, a winch 90 and winch cable 92 are mounted to the trailer 14.

It should be appreciated that the rack 16 has any suitable towing eye or lug for attachment of the winch cable 92. It should also be appreciated that the rack 16 includes a side panel door 94 in order to gain access to the towing eye or lug.

First, the trailer 14 is backed up to the front section 26 of the rack 16 and the winch cable 92 is attached to the towing eye or lug of the rack 16. The truck driver adjusts the position of the trailer 14 such that each slide rail 60 of the trailer 14 aligns with the corresponding slide channel 62 of the rack 14. The support arms 50 may be partially lowered and the rear section 24 of the trailer 14 may be partially raised to make it easier to align the slide rails 60 with the slide channels 62.

Once the slide channels 62 are matched up with the slide rails 60, the winch 90 is operated to drag the rack 16 onto the trailer 14. As the rack 16 is pulled onto the trailer 14, each slide channel 62 travels over its corresponding slide rail 60 to guide the rack 16 in the proper position onto the trailer 14.

After the rack 16 is completely on the trailer 14, the rear section 24 of the trailer 14 is elevated and secured into the transport position, as described hereinabove. Then the lock bars 64 are moved into the locking position and locked, as previously disclosed herein.

Removing the Rack from the Trailer

Removing the rack 16 from the trailer 14 is best understood by referring to FIG. 2. First, the trailer 14 and rack 16 are positioned where the rack is to be placed on the ground.

Next, the rear of the rack 16 is secured to a solid object, such as a large tree or a well-anchored post. The winch cable 92 is disconnected from the rack 16 and all the lock bars 64 are unlocked and pivoted to move the lock lugs 70 out of the channel and rail slots 80 and 78. Then, the truck 12 is slowly driven forward to slide the rack 16 off the rear of the trailer 14, as shown in FIG. 2.

As the rack 16 tilts downward off the rear of the trailer, the rear section 24 of the trailer 14 may be lowered to place the rack 16 on the ground as gently as possible. The truck is driven forward until the rack 16 slides completely off the trailer 14 to the ground.

It should be appreciated that one person is able to remove the rack 16 from the trailer 14 in ten to twenty minutes. It is also possible for one person to winch the rack 16 from the ground onto the trailer 14 and to lock the rack 16 to the trailer 14 in less than twenty minutes. Thus, the rack 16 and trailer 14 have the advantage of being operable by one person. Further, the rack 16 is easily converted between on-the-ground, on-the-trailer, ground-loading and transporting modes.

The rack 16 disclosed hereinabove is constructed for holding, loading, transporting and unloading livestock. It should be appreciated that the trailer 14 may be used with a wide variety of racks designed for many purposes. For example, a hay rack having side rails to contain hay, bales of hay or sacks of feed may be locked onto the trailer 14 for use in hauling hay or feed.

As another example, racks constructed like grain hoppers may be provided with slide channels 62 for use with the slide rails 60 of the trailer 14 as described hereinabove. Further, other styles of racks may be used with the trailer 14 for transporting various farm vehicles, implements and materials. Thus, a single trailer 14 may be utilized in a wide variety of ways by simply changing the rack.

It should be appreciated that the winch 90 and hydraulic cylinders 46 and 54 are operatively connected to the hydraulics of the truck 12 in any conventional manner. Further, it should be understood that the trailer 14 and rack 16 include lights and other electrical components connected to the electrical system of the truck 12 for the safe and convenient operation of the truck 12, trailer 14 and rack 16.

Changes may be made in the combinations, operations and arrangements of the various parts and elements described herein without departing from the spirit and scope of the invention as defined in the following claims.

What is claimed is:

1. Apparatus for loading, hauling and unloading livestock, comprising:
    a trailer bed supported on wheels having an upper surface, a lower surface and a rear section pivotally secured to the adjacent portion of the bed behind the wheels for movement between a position parallel with the remainder of the bed and a position extending downwardly and rearwardly from the remainder of the bed;
    a pair of parallel rails on the upper surface of the bed extending lengthwise along the bed;
    a livestock containment rack having a length corresponding to the length of the trailer bed and having a lower surface;
    a pair of channels on the lower surface of the rack sized and arranged to mate with the rails on the upper surface of the bed;
    means for pulling the rack onto the bed with the channels on the rack mating with the rails on the bed;
    said rack having a rear section corresponding in length with the rear section of the bed pivotally secured to the adjacent portion of the rack for movement between a livestock loading chute position and a hauling position when the rear section of the bed is parallel with the remaining portion of the bed;
    means for pivoting the rear section of the bed between a livestock loading position of the rear section of the rack and a livestock hauling position of the rear section of the rack; and
    means for bracing the rear section of the bed in a livestock hauling position.

2. Apparatus as defined in claim 1 characterized further to include:
    screens between the sections of the rack to close the spaces between the sections of the rack when the rear section of the rack is lowered to a loading position.

3. Apparatus as defined in claim 1 wherein the means for bracing the rear section of the bed in a hauling position includes:
    a pair of support arms having forward ends and rear ends with the forward ends thereof pivotally secured to the bed below the lower surface of the rear section of the bed when the rear section of the rack is in a livestock hauling position;

a pair of brace pockets on the lower surface of the rear section of the bed arranged to receive the rear ends of the support arms when the rear section of the rack is in the hauling position to thereby brace the rear section of the rack in a hauling position; and means for moving the support arms between a position extending downwardly and rearwardly out of said pockets and upwardly and rearwardly into engagement with said pockets.

\* \* \* \* \*